(12) United States Patent
Adam et al.

(10) Patent No.: US 7,723,530 B2
(45) Date of Patent: May 25, 2010

(54) USE OF POLYMERISABLE DIKETOPYRROLOPYRROLES IN COLOUR FILTERS

(75) Inventors: Jean-Marie Adam, Rosenau (FR); Gerardus De Keyzer, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 12/006,520

(22) Filed: Jan. 3, 2008

(65) Prior Publication Data

US 2008/0108831 A1    May 8, 2008

Related U.S. Application Data

(62) Division of application No. 10/522,212, filed as application No. PCT/EP03/07638 on Jul. 15, 2003, now abandoned.

(30) Foreign Application Priority Data

Jul. 22, 2002    (EP)    ................... 02405640

(51) Int. Cl.
*C07D 207/00* (2006.01)
(52) U.S. Cl. ...................... 548/400; 548/453
(58) Field of Classification Search ................. 548/400, 548/453
See application file for complete search history.

(56) References Cited

U.S. PATENT DOCUMENTS

| | | | |
|---|---|---|---|
| 5,750,723 A | 5/1998 | Eldin et al. | 548/453 |
| 5,847,156 A | 12/1998 | Eldin et al. | 548/453 |
| 5,919,944 A * | 7/1999 | Eldin | 548/453 |
| 6,048,918 A | 4/2000 | Eldin et al. | 524/92 |
| 6,107,491 A * | 8/2000 | Eldin | 548/453 |
| 6,451,459 B1 * | 9/2002 | Tieke et al. | 428/690 |
| 6,471,765 B2 * | 10/2002 | De Keyzer | 106/494 |

FOREIGN PATENT DOCUMENTS

| | | |
|---|---|---|
| EP | 0337951 | 10/1989 |
| EP | 0654711 | 5/1995 |
| EP | 0787730 | 8/1997 |
| EP | 0787731 | 8/1997 |
| EP | 0811625 | 12/1997 |
| EP | 0894798 | 2/1999 |
| WO | 99/54332 | 10/1999 |

* cited by examiner

*Primary Examiner*—Susannah Chung
(74) *Attorney, Agent, or Firm*—Joseph C. Suhadolnik

(57) ABSTRACT

The present invention relates to the use of polymerisable diketopyrrolopyrroles in colour filters, which can themselves be used for example in electro-optical systems such as TV screens, liquid crystal displays, charge coupled devices, plasma displays or electroluminescent displays and the like.

In contrast to conventional pigments the polymerisable diketopyrrolopyrroles do not tend to aggregate and, hence, show very good dispersibility. Color filters prepared by using the polymerisable diketopyrrolopyrroles have high transparence and pure hue. In addition, they facilitate adjustment of color points and enable a large choice of shades.

8 Claims, No Drawings

USE OF POLYMERISABLE DIKETOPYRROLOPYRROLES IN COLOUR FILTERS

This is a divisional of U.S. application Ser. No. 10/522,212 filed Jan. 14 2005, now abandoned which is a 371 of PCT/EP03/07638, filed on Jul. 15. 2003, which application are hereby incorporated by reference.

The present invention relates to the use of polymerisable diketopyrrolopyrroles in colour filters, which can themselves be used for example in electro-optical systems such as TV screens, liquid crystal displays, charge coupled devices, plasma displays or electroluminescent displays and the like. These may be, for example, active (twisted nematic) or passive (supertwisted nematic) ferroelectric displays or light-emitting diodes.

Accordingly, in one aspect the present invention relates to colour filters comprising a transparent substrate and a layer comprising from 1 to 75% by weight, preferably from 5 to 50% by weight, with particular preference from 25 to 40% by weight, based on the overall weight of the layer, of a diketopyrrolopyrrole of the general formula (I) dispersed in a high molecular mass organic material

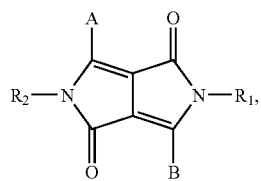
(I)

wherein A and B independently of one another are a group of the formula

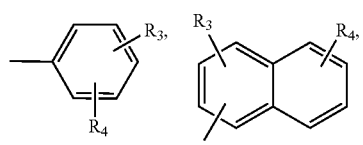

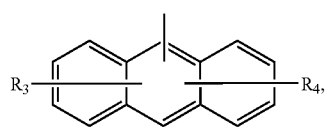

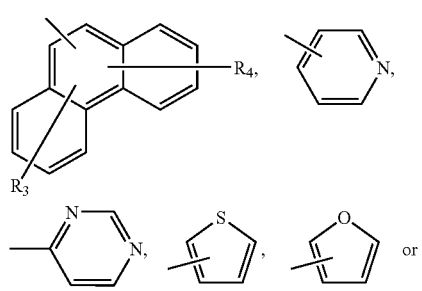

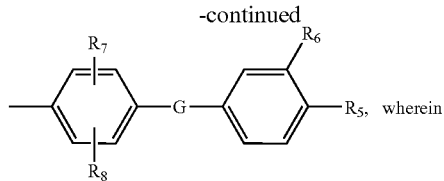

$R_3$ and $R_4$ independently of one another are hydrogen, halogen, $C_1$-$C_{18}$alkyl, $C_1$-$C_{18}$alkoxy, —$NR_{16}R_{17}$, —$CONHR_{18}$, —$COOR_{19}$, —$SO_2NH$—$R_{20}$, $C_1$-$C_{18}$alkoxycarbonyl, $C_1$-$C_{18}$alkylaminocarbonyl, —CN, —$NO_2$, trifluoromethyl, $C_5$-$C_7$cycloalkyl, —C=N—($C_1$-$C_{18}$alkyl),

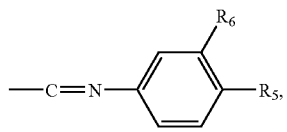

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, G is —$CH_2$—, —$CH(CH_3)$—, —$C(CH_3)_2$—, —CH=N—, —N=N—, —O—, —S—, —SO—, —$SO_2$—, —CONH— or —$NR_9$—, $R_5$ and $R_6$ independently of one another are hydrogen, halogen, $C_1$-$C_6$alkyl, $C_1$-$C_{18}$alkoxy or —CN, $R_7$ and $R_8$ independently of one another are hydrogen, halogen or $C_1$-$C_6$alkyl and $R_9$ is hydrogen or $C_1$-$C_6$alkyl, $R_1$ and $R_2$ are independently of each other $C_1$-$C_{18}$alkyl, $C_1$-$C_{18}$alkyl, which is interrupted one or more times by O or S, $C_6$-$C_{12}$aryl, $C_7$-$C_{12}$aralkyl, or a group of the formula —C(O)$OR_{10}$, wherein $R_{10}$ is $C_1$-$C_{18}$alkyl, $C_5$-$C_{10}$cycloalkyl, $C_6$-$C_{12}$aryl, or $C_7$-$C_{12}$aralkyl, or a group of the formula —$X_2$—$X_3$(II), wherein $X_2$ is an alkylene, arylene, aralkylene or cycloalkylene spacer containing optionally one or more groups —O—, —S—, —$NR_{14}$—, —CO—, —CONH—, —$CONR_{15}$—, or —COO— as linking bridge, $X_3$ is —OH, —$NH_2$, —C($R_{11}$)=$CH_2$, —OC(O)—C($R_{12}$)=$CH_2$, —C(O)—C($R_{12}$)=$CH_2$, $C_5$-$C_7$cycloalkenyl,

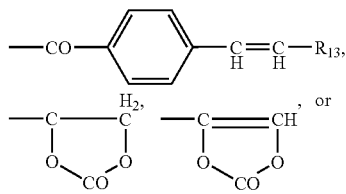

—OC(O)—N—$X_4$—N—C(O)—O—$X_5$—O—C(O)—C($R_{12}$)=$CH_2$; wherein $R_{11}$, is hydrogen, or $C_1$-$C_4$alkyl, or halogen, $R_{12}$ is hydrogen, $C_1$-$C_4$alkyl, or halogen, $R_{13}$ is hydrogen, $C_1$-$C_4$alkyl, or $C_6$-$C_{12}$aryl, $R_{14}$ and $R_{15}$ are independently of each other hydrogen, $C_1$-$C_8$alkyl, or $C_6$-$C_{12}$aryl, $R_{16}$, $R_{17}$, $R_{18}$ and $R_{20}$ are independently of each other hydrogen, $C_1$-$C_{18}$alkyl, $C_6$-$C_{12}$aryl, or $C_7$-$C_{12}$aralkyl, $R_{19}$ is $C_1$-$C_{18}$alkyl, $C_6$-$C_{12}$aryl, or $C_7$-$C_{12}$aryl, and $X_4$ and $X_5$ are independently of each other an alkylene, arylene, aralkylene or cycloalkylene spacer, $R_3$, $R_4$, $R_5$, $R_6$, $R_7$, and $R_8$ can also be a group of formula —$X_1$—$X_2$-$X_3$(III), wherein $X_1$ is a single bond, —O—, —S—, —NH—, —CONH—, —COO—, —$SO_2$—NH—, or —$SO_2$—O—, and $X_2$ and $X_3$ are as defined above, with the proviso that at least one, preferably two, of the groups of the formula (II) and/or (III) is present per molecule.

$X_1$ is preferably a single bond, —O—, —S—, —NH—, —CONH—, or —$SO_2$—NH—.

$X_2$ is preferably an alkylene spacer containing optionally one or more, in particular one or two groups, —O—, —S—, —$NR_{14}$—, —CO—, —CONH—, —$CONR_{15}$—, or —COO— as linking bridge. The number of carbon atoms of the alkylene spacer is preferably greater than 4, more preferred greater than 6 and most preferred in the range of 8 to 16.

$X_3$ is preferably —OH, —$NH_2$, —OC(O)—C($R_{12}$)=$CH_2$, —C(O)—C($R_{12}$)=$CH_2$, or —OC(O)—N—$X_4$—N—C(O)—O—$X_5$—O—C(O)—C($R_{12}$)=$CH_2$; wherein $R_{12}$ is hydrogen, or methyl, and $X_4$ and $X_5$ are as defined above.

Preferably the diketopyrrolopyrroles have the general formula

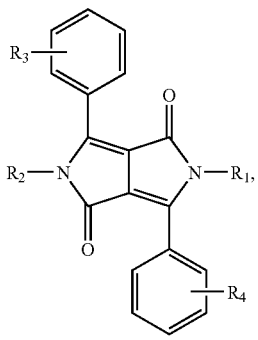

(IV)

wherein $R_1$ and $R_2$ are independently of each other a group of the formula

—$X_2$-$X_3$(II), wherein $X_2$ is an alkylene, arylene, aralkylene or cycloalkylene spacer containing optionally one or more groups —O—, —S—, —$NR_{14}$—, —CO—, —CONH—, —$CONR_{15}$—, or —COO— as linking bridge, $X_3$ is OH, $NH_2$, —C($R_{11}$)=$CH_2$, —OC(O)—C($R_{12}$)=$CH_2$, —C(O)—C($R_{12}$)=$CH_2$, or —OC(O)—N—$X_4$—N—C(O)—O—$X_5$—O—C(O)—C($R_{12}$)=$CH_2$; wherein $R_{11}$ is hydrogen, or methyl, $R_{12}$ is hydrogen, or methyl, $R_{14}$ and $R_{15}$ are independently of each other hydrogen, $C_1$-$C_8$alkyl, or $C_6$-$C_{12}$aryl, and $X_4$ and $X_5$ are as defined above;

$R_3$ and $R_4$ independently of one another are $C_1$-$C_{18}$alkyl, $C_1$-$C_{18}$alkoxy, —$NR_{16}R_{17}$, —$CONHR_{18}$, —$COOR_{19}$, —$SO_2NH$—$R_{20}$, $C_1$-$C_{18}$alkoxycarbonyl, $C_1$-$C_{18}$alkylaminocarbonyl, wherein $R_{16}$, $R_{17}$, $R_{18}$, $R_{19}$ and $R_{20}$ are $C_1$-$C_{18}$alkyl, wherein diketopyrrolopyrroles are more preferred, wherein $R_1$ and $R_2$ are independently of each other a radical of the formula —$X_2$-$X_3$, wherein $X_2$ is $C_1$-$C_{18}$alkylene and $X_3$ is —$NH_2$, —OH, —CH=$CH_2$, —C($CH_3$)=$CH_2$, —OCO—CH=$CH_2$ or —OCO—C($CH_3$)=$CH_2$, —CO—CH=$CH_2$ or —CO—C($CH_3$)=$CH_2$ and/or wherein $R_3$ and $R_4$ are independently of each other $C_1$-$C_{18}$alkylmercapto, $C_1$-$C_{18}$alkoxy, or —$NR_{16}R_{17}$, wherein one of the groups $R_{16}$ and $R_{17}$ is hydrogen and the other is $C_1$-$C_{18}$alkyl or both groups $R_{16}$ and $R_{17}$ are independently of each other $C_1$-$C_{18}$alkyl; or of the general formula

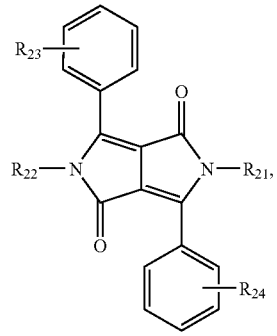

(V)

in which $R_{21}$ and $R_{22}$ are independently of one another hydrogen, $C_1$-$C_{18}$alkyl, $C_1$-$C_{18}$alkyl which is interrupted one or more times by O or S, $C_7$-$C_{12}$aralkyl or a group of the formula

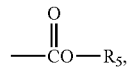

in which $R_5$ is $C_1$-$C_{18}$alkyl, $R_{23}$ and $R_{24}$ independently of one another are a group of formula —$X_1$-$X_2$-$X_3$, wherein $X_1$ is a single bond, —O—, —S—, —NH—, —CONH—, —COO—, —$SO_2$—NH—, or —$SO_2$—O—, $X_2$ is an alkylene, arylene, aralkylene or cycloalkylene spacer containing optionally one or more groups —O—, —S—, —$NR_{14}$—, —CO—, —CONH—, —$CONR_{15}$—, or —COO— as linking bridge, $X_3$ is —OH, —$NH_2$, —C($R_{11}$)=$CH_2$, —OC(O)—C($R_{12}$)=$CH_2$, —C(O)—C($R_{12}$)=$CH_2$, or —OC(O)—N—$X_4$—N—C(O)—O—$X_5$—O—C(O)—C($R_{12}$)=$CH_2$; wherein $R_{11}$ is hydrogen, or methyl, $R_{12}$ is hydrogen, or methyl, $R_{14}$ and $R_{15}$ are independently of each other hydrogen, $C_1$-$C_8$alkyl, or $C_6$-$C_{12}$aryl, and $X_4$ and $X_5$ are independently of each other an an alkylene, arylene, aralkylene or cycloalkylene spacer, wherein a diketopyrrolopyrrole is more preferred, wherein $R_{23}$ and $R_{24}$ independently of one another are a group of formula

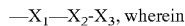, wherein $X_1$ is —S—, —SO$_2$NH— or —NH—, $X_2$ is a $C_1$-$C_{18}$alkylene group, and $X_3$ is —OH, —NH$_2$, —CH═CH$_2$, —C(CH$_3$)═CH$_2$, —OCO—CH═CH$_2$ or —OCO—C(CH$_3$)═CH$_2$, —CO—CH═CH$_2$, or —CO—C(CH$_3$)═CH$_2$, and/or diketopyrrolopyrroles, wherein $R_{21}$ and $R_{22}$ independently of one another are hydrogen, or $C_1$-$C_{18}$alkyl.

In contrast to conventional pigments the diketopyrrolopyrroles of formula I do not tend to aggregate and, hence, show very good dispersibility. Color filters prepared by using the diketopyrrolopyrroles of formula I have high transparence and pure hue. In addition, they facilitate adjustment of color points and enable a large choice of shades.

The pigments will generally be used in the manufacture of colour filters as a dispersion in an organic solvent or water. There are several ways to manufacture these colour filters, which follow two mainstreams:

Direct patterning during applying;

Patterning after applying the pigment.

Direct patterning can be obtained by several printing techniques, such as impact (off-set, flexography, stamping, letterpress etc.) as well as non-impact (ink jet techniques).

Other direct patterning techniques are based on lamination processes, electronic discharging processes like electrodeposition and some special colour proofing methods, like the so-called Chromalin™ process (DuPont).

For impact printing techniques, the pigment may be dispersed in water or organic solvents by standard de-agglomeration methods (Skandex, Dynomill, Dispermat and the like) in the presence of a dispersant and a polymeric binder to produce an ink. Any dispersion technique known in the field, including the choice of solvent, dispersant and binder, can be used. The type of ink and its viscosity depend on the application technique and are well-known to the skilled artisan. Most usual binders, to which the invention is of course not limited, are (meth)acrylates, epoxies, PVA, polyimids, Novolak systems and the like as well as combinations of these polymers.

The ink dispersion then can be printed on all kind of standard printing machines. Curing of the binder system is preferably achieved by a heating process. The three colours can be applied at once or in different printing steps with intermediate drying and/or curing steps, for example one colour at the time in three printing steps.

Inks for use in ink jet, for example piezo or bubble jet, can be prepared likewise. They generally contain a pigment dispersed in water and/or one or a mixture of many hydrophilic organic solvents in combination with a dispersant and a binder.

For ink jet printing a standard ink jet printer can be used or a dedicated printer can be built in order to optimize for example the printing speed etc.

For lamination techniques, like thermal transfer and the like, a web system has to be made: The pigment is dispersed in a solvent or water with dispersant and binder and coated on a foil and dried. The pigment/binder system can be patternwise or uniformly transferred to a colour filter substrate with the help of energy (UV, IR, heat, pressure etc.). Depending on the technique used, the colourant for example may be transferred alone (dye diffusion or sublimation transfer), or the colourant dispersion may be entirely transferred including the binder (wax transfer).

For electrodeposition, the pigment has to be dispersed in water together with an ionized polymer. By means of an electrical current, the ionized polymer is deionized at the anode or the cathode and, being insoluble then, deposited together with the pigments. This can be done on patterned or patternwise shielded, by a photoresist, (transparent) photoconductors like ITO etc.

The Chromalin™ process makes use of a photosensitive material, deposited on a colour filter substrate. The material becomes tacky upon UV exposure. The so called 'toner', comprising a mixture or compound of pigment and polymer, is distributed on the substrate and sticks on the tacky parts. This process has to be done three to four times for R, G, B and eventually black.

Patterning after applying is a method based mostly on the known photoresist technology, wherein the pigment is dispersed in the photoresist composition. Other methods are indirect patterning with the help of a separate photoresist or lamination techniques.

The pigment may be dispersed into photoresists by any standard method such as described above for the printing processes. The binder systems may also be identical. Further suitable compositions are described for example in EP 654711, WO 98/45756 or WO 98/45757. Photoresists comprise a photoinitiator and a poly-crosslinkable monomer (negative radical polymerization), a material to crosslink the polymers itself (for example a photoacid generator or the like) or a material to chemically change the solubility of the polymer in certain developing media. This process, however, can also be done with heat (for example using thermal arrays or an NIR beam) instead of UV, in the case of some polymers which undergo chemical changes during heating processes, resulting in changes of solubility in the mentioned developing media. A photoinitiator is then not needed.

The photosensitive or heat sensible material is coated on a colour filter substrate, dried and UV (or heat) irradiated, sometimes again baked (photoacid generators) and developed with a developing medium (mostly a base). In this last step only the non-exposed (negative systems) or only the exposed (positive systems) parts are washed away, giving the wanted pattern. This operation has to be repeated for all the colours used.

Photosensitive lamination techniques are using the same principle, the only difference being the coating technique. A photosensitive system is applied as described above, however on a web instead of a colour filter substrate. The foil is placed on the colour filter substrate and the photosensitive layer is transferred with the help of heat and/or pressure.

Indirect processes, with the above mentioned polymeric binders without a photosensitive component, make use of an extra photoresist, coated on top of the pigmented resist. During the patterning of the photoresist, the pigmented resist is patterned as well. The photoresist has to be removed afterwards.

More details about the manufacture of colour filters can be found in text books, reviews and other scientific articles. The skilled artisan will associate the instant invention with the use of any such known technique as well.

For example, which is of course in no way limitative, substantially colourless methacrylic resins are commonly used in colour filters, examples thereof which are known to the skilled artisan being copolymers of aromatic methacrylates with methacrylic acid of $M_W$ from 30'000 to 60'000. Such resins are highly appropriated to make films by spin-coating.

The colour filters of the invention contain the pigment compositions of the invention judiciously in a concentration of from 1 to 75% by weight, preferably from 5 to 50% by weight, with particular preference from 25 to 40% by weight, based on the overall weight of the pigmented layer.

The invention therefore likewise provides a colour filter comprising a transparent substrate and a layer comprising from 1 to 75% by weight, preferably from 5 to 50% by weight, with particular preference from 25 to 40% by weight, based on the overall weight of the layer, of a pigment composition of the invention or the individual components of said composition dispersed in a high molecular mass organic material. The substrate is preferably essentially colourless (T≧95% all over the visible range from 400 to 700 nm).

The instant printing inks or photoresists for making colour filters contain the pigment compositions of the invention judiciously in a concentration of from 0.01 to 40% by weight, preferably from 1 to 25% by weight, with particular preference from 5 to 10% by weight, based on the overall weight of the printing ink or photoresist.

The invention therefore likewise provides a composition for making colour filters comprising from 0.01 to 40% by weight, preferably from 1 to 25% by weight, with particular preference from 5 to 10% by weight, based on the overall weight of the composition, of a pigment composition of the invention dispersed therein.

This pigment composition also may additionally contain other colorants of different structure.

The additional components will shift the mixture's spectrum hypsochromically or batho-chromically depending on their own hue. The skilled artisan will appreciate by himself which colorants can additionally be used, and in which amounts, depending on the desired colour. In certain cases, it is advantageous to use the inventive compositions in mixture or in combination with other additives such as wetting agents, surfactants, defoamers, antioxidants, UV absorbers, light stabilizers, plasticizers, or general texture improving agents and so forth. Generally such additives can be used in a concentration from about 0.1 to 25 percent, preferably from about 0.2 to 15% and most preferably from about 0.5 to 8%, by weight based on the total weight of (a), (b) and (c).

Suitable surfactants include anionic surfactants such as alkylbenzene- or alkylnaphthalene-sulfonates, alkylsulfosuccinates or naphthalene formaldehyde sulfonates; cationic surfactants including, for example, quaternary salts such as benzyl tributyl ammonium chloride; or nonionic or amphoteric surfactants such as polyoxyethylene surfactants and alkyl- or amidopropyl betaines, respectively.

Suitable texture improving agents are, for example, fatty acids such as stearic acid or behenic acid, and fatty amines such as laurylamine and stearylamine. In addition, fatty alcohols or ethoxylated fatty alcohols, polyols such as aliphatic 1,2-diols or epoxidized soy bean oil, waxes, resin acids and resin acid salts may be used for this purpose.

Suitable UV stabilizers are, for example, the known benzotriazole derivatives (see, for example, U.S. Pat. No. 6,184, 375, column 20, line 48 to column 21, line 15) and 2-(2-hydroxyphenyl)-1,3,5-triazines (see, for example, U.S. Pat. No. 6,184,375, column 22, line 41 to 65) known under the trade name TINUVIN® or CIBA® Fast H Liquid an aryl sulfonated benzotriazol, both being products of CIBA Specialty Chemicals Corporation.

The term "halogen" is generally iodine, fluorine, bromine or chlorine, preferably bromine or chlorine.

$C_1$-$C_4$alkyl group is methyl, ethyl, n-propyl, isopropyl, n-butyl, sec-butyl, isobutyl or tert-butyl;

$C_1$-$C_8$alkyl is, for example, methyl, ethyl, n-propyl, isopropyl, n-butyl, sec-butyl, isobutyl, tert-butyl; n-amyl, tert-amyl or hexyl;

$C_1$-$C_{18}$alkyl is, for example, methyl, ethyl, n-propyl, isopropyl, n-butyl, sec-butyl, isobutyl, tert-butyl, n-amyl, tert-amyl, hexyl, heptyl, octyl, 2-ethylhexyl, nonyl, decyl, dodecyl, tetradecyl, hexadecyl or octadecyl.

The term "alkylene" means in general linear or branched $C_1$-$C_{18}$alkylene, wherein examples of preferred linear representatives are for example —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_{12}$—, —$(CH_2)_{13}$—, —$(CH_2)_{14}$—, —$(CH_2)_{15}$—, —$(CH_2)_{16}$—, —$(CH_2)_{17}$—, —$(CH_2)_{18}$—, preferably $C_4$-$C_{16}$alkylene such as —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_1$—, or —$(CH_2)_{12}$—.

The "alkoxy group" in $C_1$-$C_{18}$alkoxy or in $C_1$-$C_{18}$alkoxycarbonyl can be linear or branched and is for example methoxy, ethoxy, n-propoxy, isopropoxy, butyloxy, hexyloxy, decyloxy, dodecyloxy, hexadecyloxy or octadecyloxy, preferably $C_1$-$C_8$alkoxy such as methoxy, ethoxy, n-propoxy, isopropoxy, butyloxy, hexyloxy, or octyloxy.

$C_1$-$C_{18}$alkylmercapto is, for example, methylmercapto, ethylmercapto, propylmercapto, butylmercapto, octylmercapto, decylmercapto, hexadecylmercapto or octadecylmercapto.

$C_1$-$C_{18}$alkylamino is, both alone and in $C_1$-$C_{18}$alkylaminocarbonyl, for example methylamino, ethylamino, propylamino, hexylamino, decylamino, hexadecylamino or octadecylamino, preferably $C_1$-$C_6$alkylamino such as methylamino, ethylamino, propylamino or hexylamino.

$C_5$-$C_{10}$cycloalkyl is preferably $C_5$-$C_7$cycloalkyl, such as, for example, cyclopentyl or cyclohexyl, especially cyclohexyl.

$C_5$-$C_7$cycloalkenyl is mono- or bicyclic cycloalkenyl, for example cyclopentenyl, cyclohexenyl or norbornenyl.

"$C_6$-$C_{12}$aryl" is typically phenyl, 1-naphthyl, 2-naphthyl, 4-biphenyl, which may be unsubstituted or substituted by, for example, one or more $C_1$-$C_4$alkyl groups, $C_1$-$C_4$alkoxy groups, or halogen atoms.

"$C_7$-$C_{12}$aralkyl" is typically benzyl, 2-benzyl-2-propyl, β-phenyl-ethyl, α,α-dimethylbenzyl, ω-phenyl-butyl, or ω,ω-dimethyl-ω-phenyl-butyl, in which both the aliphatic hydrocarbon group and aromatic hydrocarbon group may be unsubstituted or substituted substituted by, for example, one or more $C_1$-$C_4$alkyl groups, $C_1$-$C_4$alkoxy groups, or halogen atoms.

The term "alkylene (spacer)" is typically $C_1$-$C_{30}$alkylene, preferably $C_1$-$C_{18}$alkylene, and embraces the linear as well as the branched representatives and can be, for example, —$CH_2$— and $C_2$-$C_{30}$alkylene, such as —$(CH_2)_2$—, —CH(Me)—, —$(CH_2)_3$—, —$CH_2$—CH(Me)—, —$C(Me)_2$-, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_{12}$—, —$(CH_2)_{13}$—, —$(CH_2)_{14}$—, —$(CH_2)_{15}$—, —$(CH_2)_{16}$—, —$(CH_2)_{17}$—, —$(CH_2)_{18}$—, —$(CH_2)_{19}$—, —$(CH_2)_{20}$, —$(CH_2)_{21}$—, —$(CH_2)_{22}$—, —$(CH_2)_{23}$—, —$(CH_2)_{24}$—, —$(CH_2)_{25}$—, —$(CH_2)_{26}$—, —$(CH_2)_{27}$—, —$(CH_2)_{28}$—, —$(CH_2)_{29}$—, —$(CH_2)_{30}$—, preferably —$CH_2$—, —$(CH_2)_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_{12}$—, —$(CH_2)_{13}$—, —$(CH_2)_{14}$—, —$(CH_2)_{15}$—, —$(CH_2)_{16}$—, —$(CH_2)_{17}$—, —$(CH_2)_{18}$—, and also —CH($C_2$-

$C_{30}$alkylene)-. The "alkylene spacer" can optionally comprise one or more, in particular one or two groups selected from —O—, —S—, —NR$_{14}$—, —CO—, —CONH—, —CONR$_{15}$—, or —COO— as linking group. $C_1$-$C_{30}$alkylene can, for example, be interrupted several times by —O—, —S—, —NH— or —C(O)NH—, such as —(CH$_2$)$_2$—O—(CH$_2$)—, —(CH$_2$)$_2$—O—(CH$_2$)$_2$—, —(CH$_2$)$_2$—S—(CH$_2$)$_2$—, —CH$_2$—CH—CH$_2$—O—(CH$_2$)$_p$—CH$_3$, wherein p is an integer from 1 to 10; or —CHX$_{13}$CH$_2$—(X$_{14}$)$_n$—OH, wherein X$_{13}$ is $C_1$-$C_8$alkyl, X$_{14}$ is an alkylene oxide monomer, preferably ethylene oxide or propylene oxide, or alkylene amino monomer, preferably amino ethylene or amino propylene, and n is an integer from 1 to 10, preferably 1 to 5; or —(CH$_2$)$_2$—NH—(CH$_2$)$_2$— or —(CH$_2$)$_2$—C(O)NH—(CH$_2$)$_2$—.

"Arylene (spacer)" is an unsubstituted or substituted carbocylic or heterocyclic arylene group, preferably containing 6 to 14 carbon atoms, typically phenylene, naphthylene, anthracenylene, anthraquinonylene, pyridinylene, quinolinylene, preferably a group

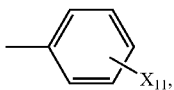

wherein X$_{11}$ is a single bond in ortho-, meta- or para-position, or —O—, —S—, —NR$_{14}$—, —CO—, —CONH—, —CONR$_{15}$—, or —COO— in ortho-, meta- or para-position; para-phenylene and para-phenyleneoxy are preferred.

"Aralkylene (spacer)" is an unsubstituted or substituted carbocylic or heterocyclic aralkylene group, preferably containing 6 to 14 carbon atoms, preferably a group

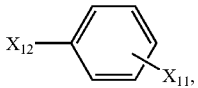

wherein X$_1$, is a single bond in ortho-, meta- or para-position, or —O—, —S—, —NR$_{14}$—, —CO—, —CONH—, —CONR$_{15}$—, or —COO— in ortho-, meta- or para-position, and X$_{12}$ is alkylene, or a group

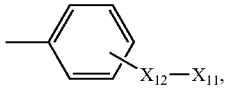

wherein X$_{12}$ is alkylene in ortho-, meta- or para-position and X$_1$, is a single bond, —O—, —S—, —NR$_{14}$—, —CO—, —CONH—, —CONR$_{15}$—, or —COO—.

"Cycloalkylene (spacer)" is an unsubstituted or substituted carbocylic or heterocyclic cycloalkylene group, preferably containing 6 to 14 carbon atoms, typically cyclohexylene, preferably a group

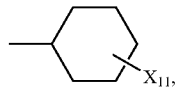

wherein X$_{11}$ is a single bond in 2-, 3- or 4-position, or —O—, —S—, —NR$_{14}$—, —CO—, —CONH—, —CONR$_{15}$—, or —COO— in 2-, 3- or 4-position; 4-cyclohexylene and 4-cyclohexylenoxy are preferred.

The diketopyrrolopyrroles of the general formula IV and V are new. Thus, another aspect of the present invention is directed to new diketopyrrolopyrroles.

These are at the one hand diketopyrrolopyrroles of the general formula

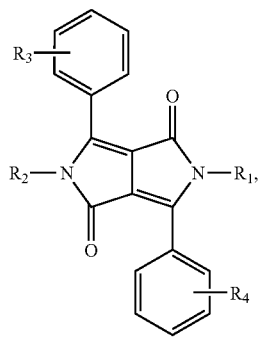

(IV)

wherein R$_1$, R$_2$, R$_3$ and R$_4$ are as defined above, preferably diketopyrrolopyrroles, wherein R$_1$ and R$_2$ are independently of each other a radical of the formula —X$_2$-X$_3$, wherein X$_2$ is $C_1$-$C_{18}$alkylene and
X$_3$ is —NH$_2$, —OH, —CH=CH$_2$, —C(CH$_3$)=CH$_2$, —OCO—CH=CH$_2$ or —OCO—C(CH$_3$)=CH$_2$, —CO—CH=CH$_2$ or —CO—C(CH$_3$)=CH$_2$ and/or wherein R$_3$ and R$_4$ are independently of each other $C_1$-$C_{18}$alkylmercapto, $C_1$-$C_{18}$alkoxy, or —NR$_{16}$R$_{17}$, wherein one of the groups R$_{16}$ and R$_{17}$ is hydrogen and the other is $C_1$-$C_{18}$alkyl or both groups R$_{16}$ and R$_{17}$ are independently of each other $C_1$-$C_{18}$alkyl; and on the other hand diketopyrrolopyrroles of the general formula

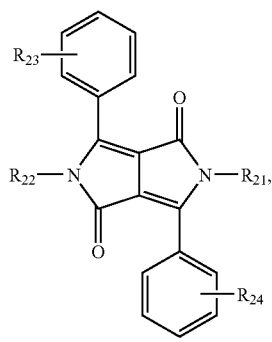

(V)

in which $R_{21}$, $R_{22}$, $R_{23}$ and $R_{24}$ are as defined above, preferably diketopyrrolopyrroles, wherein $R_{23}$ and $R_{24}$ independently of one another are a group of formula —$X_1$-$X_2$-$X_3$, wherein $X_1$ is —S—, —SO$_2$NH— or —NH—,
$X_2$ is a $C_1$-$C_{18}$alkylene group, and
$X_3$ is —OH, —NH$_2$, —CH=CH$_2$, —C(CH$_3$)=CH$_2$, —OCO—CH=CH$_2$, —OCO—C(CH$_3$)=CH$_2$, —CO—CH=CH$_2$,
or —CO—C(CH$_3$)=CH$_2$, and/or
diketopyrrolopyrroles, wherein $R_{21}$ and $R_{22}$ independently of one another are hydrogen, or $C_1$-$C_{18}$alkyl.

Preferably $R_1$ is $R_2$, $R_3$ is $R_4$ in formula IV and $R_{21}$ is $R_{22}$, $R_{23}$ is $R_{24}$ in formula V. In addition, the sum of the number of carbon atoms of $R_1$ and $R_3$ (as well as $R_2$ and $R_4$) and $R_{21}$ and $R_{23}$ (as well as $R_{22}$ and $R_{24}$) is preferably 12±6, most preferred 12±4.

Particularly preferred are diketopyrrolopyrroles of the (IVa)

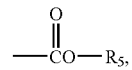

wherein $R_3$ and $R_4$ are preferably identical and are $C_1$-$C_{16}$alkyl, $C_1$-$C_{16}$alkoxy, —NR$_{16}$R$_{17}$, —CONHR$_{18}$, or —SO$_2$NH—R$_{20}$, wherein $R_{16}$ and $R_{17}$ are independently of each other both $C_1$-$C_{16}$alkyl or one of the groups $R_{16}$ and $R_{17}$ is hydrogen and the other is $C_1$-$C_{16}$alkyl, $R_{18}$, $R_{19}$ and $R_{20}$ are $C_1$-$C_{16}$alkyl, and $R_{18}$ is $C_1$-$C_{15}$alkyl;

$X_2$ is a group —(X$_{22}$)$_{n2}$—X$_{23}$-, wherein n2 is 0 or 1, $X_{22}$ is —CONH—, —CONR$_{15}$—, or —COO—, $X_{23}$ is an alkylene having 2 to 16 carbon atoms, preferably —(CH$_2$)$_{n3}$—, wherein n3 is 2 to 16, and $X_3$ is —OH, —NH$_2$, —C(R$_{11}$)=CH$_2$, —C(O)—C(R$_{12}$)=CH$_2$, —OC(O)—C(R$_{12}$)=CH$_2$ or
—OC(O)—N—X$_4$—N—C(O)—O—X$_5$—O—C(O)—C(R$_{12}$)=CH$_2$; wherein
$R_{11}$ is hydrogen, or methyl,
$R_{12}$ is hydrogen, or methyl,
and $X_4$ and $X_5$ are as defined above; preferably $X_4$ is p-phenylene, 4,4'-diphenylene, 1,4-cyclohexylene, or —(CH$_2$)$_{n4}$—, wherein n4 is 3 to 6, and diketopyrrolopyrroles of the formula

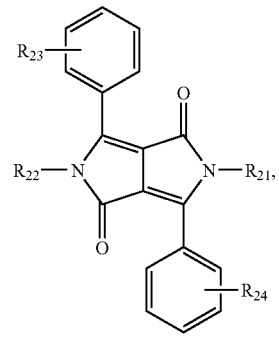

(Va)

in which $R_2$, and $R_{22}$ are independently of one another hydrogen, $C_1$-$C_{16}$alkyl, $C_1$-$C_{16}$alkyl which is interrupted one or more times by O or S, $C_7$-$C_{12}$aralkyl or a group of the formula $$—\overset{\overset{O}{\|}}{C}O—R_5,$$

in which $R_5$ is $C_1$-$C_{18}$alkyl,
$R_{23}$ and $R_{24}$ independently of one another are a group of formula —$X_1$—$X_2$-$X_3$, wherein $X_1$ is —O—, —S—, —NH—, or —SO$_2$—NH—,
$X_2$ is an is an alkylene having 2 to 16 carbon atoms, preferably —(CH$_2$)$_{n3}$—, wherein n3 is 2 to 16,
$X_3$ is —OH, —NH$_2$, —C(R$_{11}$)=CH$_2$, —C(O)—C(R$_{12}$)=CH$_2$, —OC(O)—C(R$_{12}$)=CH$_2$ or
C(O)—N—X$_4$—N—C(O)—O—X$_5$—O—C(O)—C(R$_{12}$)=CH$_2$; wherein
$R_{11}$ is hydrogen, or methyl,
$R_{12}$ is hydrogen, or methyl,
and $X_4$ and $X_5$ are as defined above; preferably $X_4$ is p-phenylene, 4,4'-diphenylene, 1,4-cyclohexylene, or —(CH$_2$)$_{n4}$—, wherein n4 is 3 to 6.

Particularly preferred are the following compounds:

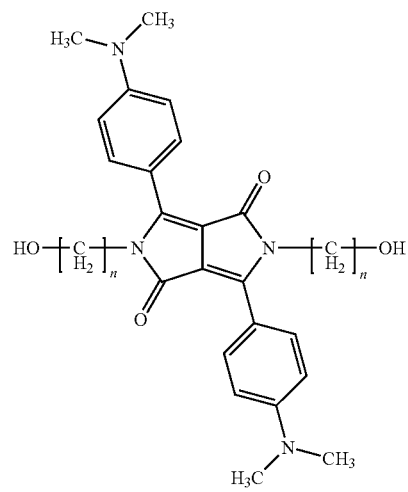

n = 4 to 6 or 8 to 16, in particular 12;

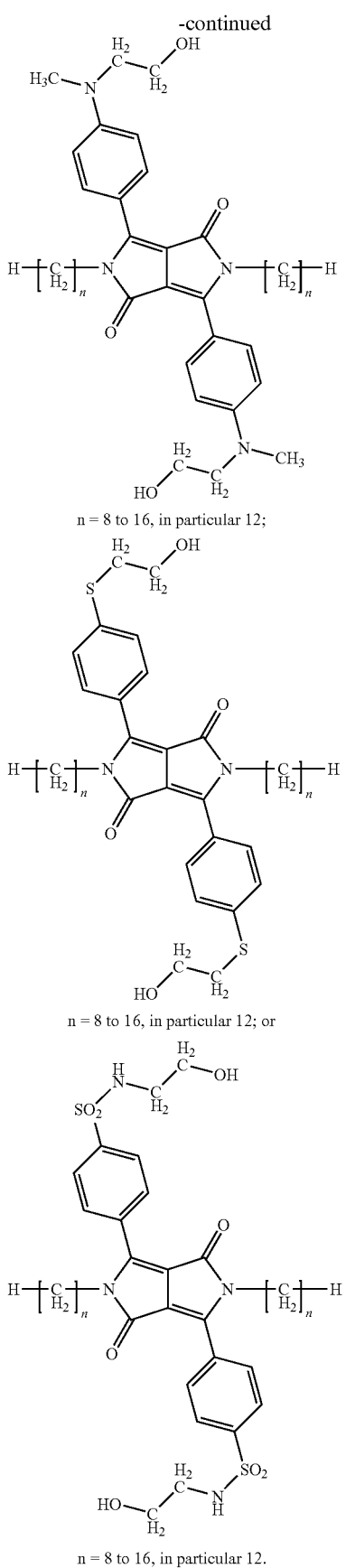

n = 8 to 16, in particular 12;

n = 8 to 16, in particular 12; or n = 8 to 16, in particular 12.

The diketopyrrolopyrroles are known or can be prepared according to known procedures, see for example: EP-A-61426, EP-A-94911, WO99/54332, WO00/14126, EP-A-787 730 and EP-A-787 730.

It has been observed, that some of the diketopyrrolopyrroles of the general formula I, especially IV and V, show fluorescence (photoluminescence). Said diketopyrrolopyrroles can be used in certain full-color OLED displays with one or few luminescent materials as color changing materials (instead of color filters). Color changing materials work by absorbing light of shorter wavelength (e.g., blue light) and then emitting light of longer wavelength by fluorescence (photoluminescence) (e.g., red or green light). The use of color changing materials is known in the art (see e.g., U.S. Pat. No. 5,126,214 (Idemitsu Kosan Co., Ltd.) and U.S. Pat. No. 5,294,870 (Eastman Kodak Co.)).

Besides the use of the diketopyrrolopyrroles for preparing color filters the diketopyrrolo-pyrroles (DPPs) IV or V can also be used for the preparation of polymers. The polymerisation of the inventive DPPs IV or V is usually carried out in a manner known per se, if desired in the presence of a suitable, preferably customary, comonomer carrying e.g. at least one carbon-carbon double bond or of a polymer carrying polyreactive groups. In a preferred embodiment of this invention, coloured (co-)polymers can be prepared by polyreacting a mixture consisting of novel DPP monomers and other customary and suitable copolymerisable monomers in liquid phase such as in a melt, solution, suspension and emulsion. Suitable copolymerisable monomers to be mentioned are, for example, the group of the acrylates, methacrylates and other customary vinylic monomers such as styrene and its customary monomer derivatives or 2-N-vinylpyrrolidone. Particularly preferred acrylates are mono-functional acrylates such as butanediolmonoacrylate, 2-hydroxyethylacrylate, butylacrylate, 2-ethylhexylacrylate, phenoxyethylacrylate, tetrahydrofurfurylacrylate, polypropylene glycol monoacrylate, bifunctional acrylates such as 1,6-hexanedioldiacrylate, tripropylene glycol di-acrylate, polyethylene glycol(200) diacrylate and polyethylene glycol(400) diacrylate, ethoxylated and propoxylated neopentyl glycol diacrylate, polyfunctional acrylates such as trimethlolpropanetriacrylate, pentaerythritoltriacrylate, ethoxylated or propoxylated trimethlolpropanetriacrylate, propoxylated glycerol triacrylate, tris(2-hydroxyethyl) isocyanurate triacrylate as well as their mixtures with one another. Such compounds are sufficiently known from, inter alia, "Strahlenhärtung", Curt R. Vincentzu Verlag, Hannover, p. 83 to 92 (1996).

These novel DPP polymers are usually prepared by commonly known methods, e.g. either by a polyreaction, i.e. by polymerisation (thermal or photochemical), polycondensation or polyaddition, or by a polymer-analogous reaction, i.e. by reacting the novel DPP compounds containing suitable reactive groups with polymers already obtained which in turn contain reactive groups (grafting). Photochemical polymerisation is preferred, especially if Q is an acrylic or methacrylic radical.

It is, thus, possible to prepare e.g. vinyl polymers, allyl polymers, vinyl ester polymers, vinylamide polymers, vinyl acetate polymers or vinyl ketone polymers from DPP monomers, the reactive groups of which contain C=C bonds; polyaldehydes, polyisocyanates, polyepoxides, polyethers, polyacetones or polylactams from monofunctional DPP monomers, the reactive groups of which contain hetero atoms; and from bifunctional DPP monomers, the reactive groups of which contain hetero atoms, via polycondensation, polyesters, polyamides, polyimides or polycarbonates and, via polyaddition, polyepoxides, polyurethanes or polyimides, the polymerisation being, for example, a radical, cationic or anionic polymerisation, coordination polymerisation or group transfer polymerisation.

DPP monomers which contain amino and hydroxy groups can also be reacted with an polyisocyanate to prepare a monomeric or polymeric isocyanate, which can be reacted with one or more hydroxy-functional acrylates or (meth)acrylates) to obtain DPP compounds having groups —OC(O)—N—X$_4$—N—C(O)—O—X$_5$—O—C(O)—C(R$_{12}$)=CH$_2$.

Examples of polyisocyanates are aliphatic diisocyanates, such as trimethylene diisocyanate, tetramethylene diisocyanate, hexamethylene diisocyanate, pentamethylene diisocyanate, 1,2-dipropylene diisocyanate, 2,4,4- or 2,2,4-trimethylhexamethylene diisocyanate, and aromatic polyisocyanates, such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate and 4,4'-diphenyl ether diisocyanate, and alicyclic diisocyanates, such as 1,3- or 1,4-cyclohexane diisocyanate, isophorone diisocyanate and 4,4'-methylenebis(cyclohexyl isocyanate).

Examples of hydroxy-functional (meth)acrylates are 2-hydroxyethyl(meth)acrylate, 2-hydroxypropyl(meth)acrylate, 2- or 4-hydroxybutyl(meth)acrylate, pentandiol mono(meth)acrylate, trimethylolpropane di(meth)acrylate, and pentaerythritol tri(meth)acrylate.

Typical examples of the preparation of DPP polymers, starting from the novel DPP monomers IV and V, are (a) the polymerisation for the preparation of DPP polyacrylates or poly-methacrylates by radical thermal polymerisation of DPP acrylates or DPP methacrylates, i.e. DPPs of formula IV or V containing an acrylic or methacrylic group, or the radical photopolymerisation of DPP acrylates or DPP methacrylates, (b) the polycondensation for the preparation of DPP-containing polyesters from DPPs of formula IV or V containing a hydroxy group, or the preparation of DPP polycarbonates from DPP diols and phosgene, (c) the polyaddition for the preparation of DPP polyurethanes from DPP diols and diisocyanates, and also (d) the polymer-analogous reaction, e.g. the reaction of a DPP alcohol with a polymer prepared from styrene and maleic acid anhydride, which thus contains anhydride groups, to a polymer containing DPP mono- or diester groups.

Where required, the novel DPP polymers also contain additives, such as light stabilisers, antioxidants and UV absorbers, which may be added during or after the actual polymerisation, e.g. also during the processing of the polymers (extrusion). These additives can them-selves also contain polyreactive groups and can in this case be copolymerised together with the DPP monomers IV or V.

The actual preparation of polymers is known from the state of the art (described, inter alia, in Houben-Weyl "Methoden der Organischen Chemie", "Makromolekulare Stoffe", Vol. E20, parts 1-3 (1986, 1987)).

If the DPPs of formula IV or V contain —CH=CH$_2$—, acrylate or methacrylate groups, the polymerisation can be carried out e.g. photochemically, one of the customary photoinitiators (see e.g. "Chemistry & Technology of UV & EB Formulations for Coatings, Inks and Paints, Vol. 3: Photoinitiators for Free Radical and Cationic Polymerization" 1991, p. 1115-325) usually being added to the reaction mixture in an amount in the range from typically 0.5 to 5% by weight, based on the sum of all monomers used.

Another preferred embodiment of this invention thus relates to polymers based on the diketopyrrolopyrroles IV or V, which are obtainable by polyreacting a mixture consisting of (A) from 0.5 to 20, preferably from 1 to 10% by weight, based on the sum of the components (A) and (B), of a diketopyrrolopyrrole IV or V, and (B) from 99.5 to 80, preferably from 99 to 90% by weight, based on the sum of the components (A) and (B), of a monomer which is copolymerisable with the diketopyrrolopyrroles IV and V, the sums of (A) and (B) making up 100% by weight.

Another embodiment of this invention relates to the use of the novel mixture for the preparation of polymers.

In another of its aspects, this invention relates to the use of polymers prepared according to this invention for colouring high molecular weight organic materials, for formulations of decorative cosmetics, for the production of inks, printing inks, paint systems, in particular automotive lacquers and photosensitive coatings, photo- and electroconducting polymers, fluorescent brighteners, photocell aggregates, coloured photoresists and dispersion paints.

The DPP polymers prepared according to this invention are particularly suitable for colouring high molecular weight organic materials, such as biopolymers, plastic materials, including fibres, glasses, ceramic products, for formulations of decorative cosmetics, for the preparation of inks, printing inks, paint systems, in particular automotive lacquers and photosensitive coatings, photo- and electroconducting polymers, fluorescent brighteners, photocell aggregates, coloured photoresists and dispersion paints, and the diketopyrrolopyrroles of this invention can also be used in the biomedical field, for example for the preparation of diagnostic agents, and in the fields of impact and non impact printing and photo/repro in general.

Illustrative examples of suitable high molecular weight organic materials which can be coloured with the novel DPP polymers, are vinyl polymers, such as polystyrene, poly-α-methyl-styrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers derived from maleinimide and/or maleic anhydride, such as copolymers of maleic anhydride with styrene; polyvinyl pyrrolidone; ABS; ASA; poly-amides; polyimides; polyamidimides; polysulfones; polyether sulfones; polyphenylene oxides; polyurethane; polyurea; polycarbonates; polyarylenes; polyarylenesulfides; polyepoxides; polyolefins, such as polyethylene and polypropylene; polyalkadienes; biopolymers and their derivatives, such as cellulose, cellulose ethers and cellulose esters, such as ethylcellulose, nitrocellulose, cellulose acetate and cellulose butyrate, starch, chitin, chitosan, gelatin, zein; natural resins; synthetic resins, such as alkyd resins, acrylic resins, phenolic resins, epoxy resins, aminoformaldehyde resins, such as urea/formaldehyde resins and melamine/formaldehyde resins; rubber; casein; silicone and silicone resins; caoutchouc, chlorinated rubber; and also polymers which are used, for example, as binders in paint systems, such as novolaks derived from $C_1$-$C_6$aldehydes, such as formaldehyde and acetaldehyde and a binuclear or mononuclear, preferably mononuclear, phenol which, if desired, is substituted by one or two $C_1$-$C_9$alkyl groups, one or two halogen atoms or a phenyl ring, such as o-, m- or p-cresol, xylene, p-tert-butylphenol, o-, m- or p-nonylphenol, p-chlorophenol or p-phenylphenol, or from a compound containing more than one phenolic group, typically resorcinol, bis(4-hydroxyphenyl)methane or 2,2-bis(4-hydroxyphenyl)propane; as well as suitable mixtures of the cited materials.

Particularly preferred high molecular weight organic materials, in particular for the preparation of a paint system, printing ink or ink, are e.g. cellulose ethers and cellulose esters, such as ethylcellulose, nitrocellulose, cellulose acetate and cellulose butyrate, natural resins or synthetic resins (polymerisation or condensation resins), such as aminoplasts, in particular urea/formaldehyde resins and melamine/formaldehyde resins, alkyd resins, phenolic plastics, polycarbonates, polyolefins, polystyrene, polyvinyl chloride, polyamides, polyurethanes, polyesters, ABS, ASA, polyphenylene oxides, rubber, casein, silicone and silicone resins as well as their possible mixtures with one another.

It is also possible to use high molecular weight organic materials in dissolved form as film formers, such as boiled linseed oil, nitrocellulose, alkyd resins, phenolic resins, melamine/formaldehyde resins and urea/formaldehyde resins and also acrylic resins.

The cited high molecular weight organic compounds can be used singly or in mixtures, e.g. as granulates, plastic compounds, melts or in the form of solutions, in particular for the preparation of spinning solutions, paint systems, coating compositions, inks or printing inks.

In a preferred embodiment of this invention, the novel DPP polymers are used for mass colouring polyvinyl chloride, polyamides and, in particular, polyolefins such as polyethylene and polypropylene, and for the preparation of paint systems, including powder coatings, inks, printing inks and paints.

Examples of preferred binders for paint systems to be mentioned are alkyd/melamine surface coating resins, acryl/melamine surface coating resins, cellulose acetate/cellulose butyrate paints and two-component paints based on acrylic resins crosslinkable with polyisocyanate.

According to findings so far, the novel DPP polymers can be added to the material to be coloured in any desired amount, depending on the end use requirements. In the case of high molecular weight organic materials, for example, the novel DDP polymers can be used in amounts in the range from 0.01 to 40, preferably from 0.1 to 20% by weight, based on the total weight of the high molecular weight organic material.

The high molecular weight organic materials are normally coloured with the novel DPP polymers such that said polymers, if desired in the form of masterbatches, are admixed to the high molecular weight organic materials using customary suitable appliances, for example extruders, roll mills, mixing or milling apparatus. The material thus treated is then usually brought into the desired final form by methods known per se, such as calendering, moulding, extruding, coating, casting or injection moulding.

In a particularly preferred embodiment of this invention, it is possible to dissolve DDPs of formal IV or V containing photocurable groups such as acrylate or methacrylate groups in other photocurable monomers, either with or without solvent, in the latter case e.g. by melting and dissolving, and then to mix them with corresponding photoinitiators and to coat suitable substrates therewith, the coatings being cured, i.e. polymerized, by means of actinic radiation, preferably UV radiation.

In another preferred embodiment of this invention, the novel DPP monomers can be poly-reacted in an extruder together with other monomers, in particular those customarily used for the preparation of the above-mentioned polymers (reactive extrusion, in analogy to the process described, inter alia, in EP-A 337 951). Copolymers prepared in this manner usually have the same spectrum of use as the blends of novel DPP polymers and high molecular weight organic materials mentioned so far.

To obtain different shades, the novel DPP polymers can be advantageously added in admixture with fillers, transparent and opaque white, coloured and/or black pigments and conventional luster pigments in the desired amount.

To prepare paint systems, coating compositions, inks and printing inks, the corresponding high molecular weight organic substances, such as binders, synthetic resin dispersions and the like, and the novel DPP compounds or polymers, are usually dispersed or dissolved, if desired together with customary additives, such as fillers, paint auxiliaries, siccatives, plasticizers and/or additional pigments, in a shared solvent or solvent mixture. This may be effected by dispersing or dissolving the individual components by themselves or also several together and only then bringing all the components together, or by adding all of them in one go. For printing applications, all conventional industrial printing methods may be used, such as screen printing, rotogravure, bronze printing, flexographic printing and offset printing.

This invention accordingly relates in another of its embodiments to coloured high molecular weight organic materials prepared by using the polymers according to this invention, to formulations of decorative cosmetics, inks, printing inks, paint systems, in particular automotive lacquers and photosensitive coatings, photo- and electroconducting polymers, fluorescent brighteners, photocell aggregates, coloured photoresists and dispersion paints, preferably to coloured high molecular weight organic materials and paint systems, particularly preferably to automotive paints and photosensitive coatings.

The polymers and copolymers prepared according to this invention and based on the novel DPP monomers IV or V show excellent migration and fastness characteristics and have high transparence and pure hue as compared to the corresponding polymers of the state of the art.

The following examples further describe some preferred embodiments of the invention, but do not limit the scope of the invention. In the examples, all parts are by weight unless otherwise indicated.

EXAMPLES

Example 1

2.4 parts of NaH were added to the stirred mixture of 9.4 parts of compound:

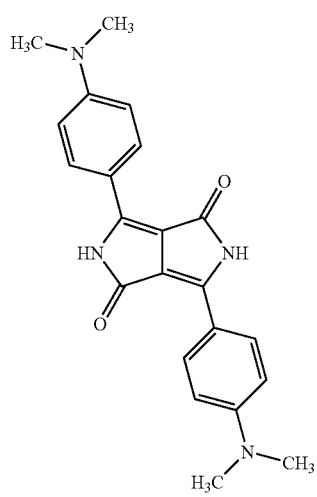

(example 30 of EP-A-94911)

and 0.6 parts of tetraethylammonium bromide in 400 parts N-methylpyrrolidone. The suspension was stirred for two hours and 13.7 parts of 6-chlorohexanol dissolved in 50 parts N-methylpyrrolidone were added dropwise over 30 minutes. The suspension was heated to 80-85° C. and stirred at that temperature over 15 hours. The reaction mixture was cooled to room temperature and diluted with 400 parts of water. The homogeneous suspension was stirred during 1 hour and then filtered. The filter cake was washed with water and dried at 600 in vacuum. 10.8 parts of compound:

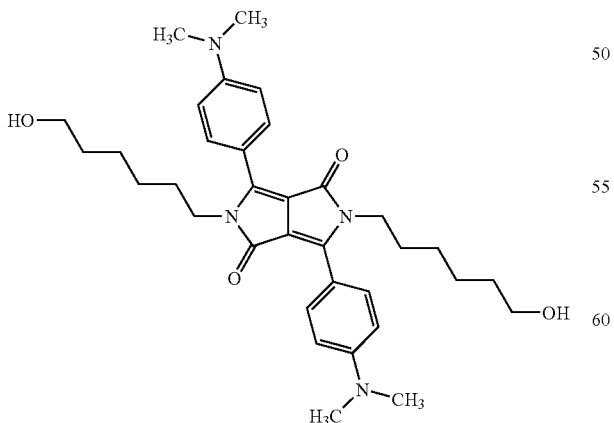

were obtained.

Example 2

2.4 parts of NaH were added to the stirred mixture of 9.6 parts of compound:

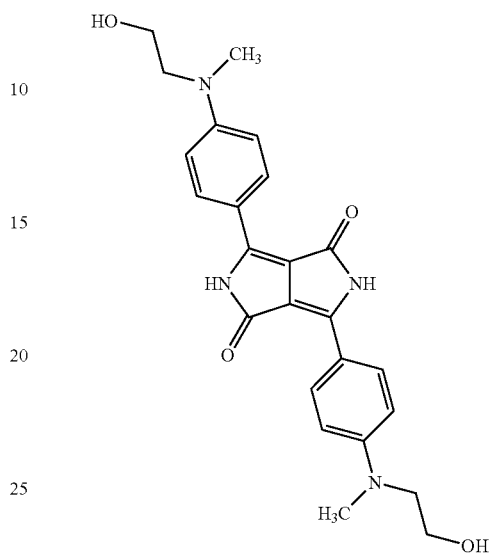

and 0.6 parts of tetraethylammonium bromide in 400 parts N-methylpyrrolidone. The suspension was stirred for two hours and 16 parts of 1-bromododecane dissolved in 50 parts N-methylpyrrolidone were added dropwise over 30 minutes. The suspension was heated to 80-85° C. and stirred at that temperature over 15 hours. The reaction mixture was cooled to room temperature and diluted with 400 parts of water. The homogeneous suspension was stirred during 1 hour and then filtered. The filter cake was washed with water and dried at 600 in vacuum. 11.6 parts of compound:

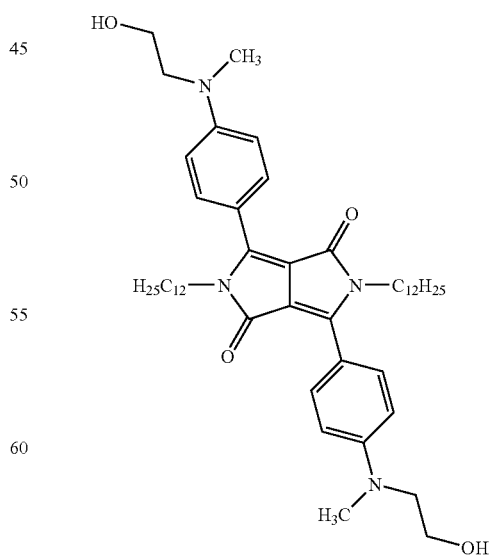

were obtained.

Example 3

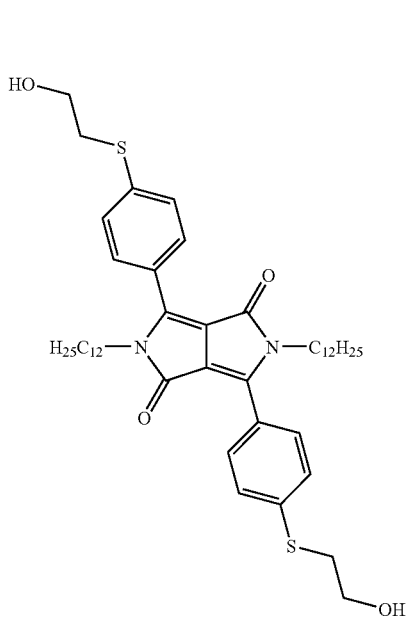

(The starting material was obtained according to example 2 of WO99/54332)

Example 4

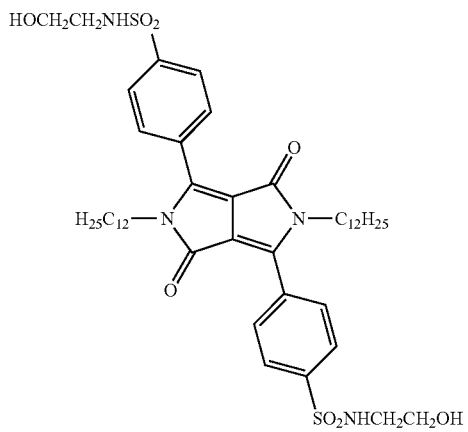

Example 5

8.7 parts of compound obtained in example 1, 6.3 parts of methacrylic chloride, 0.5 parts pyridine, and 0.2 parts thiodiphenylamine were dissolved in 300 parts dichloromethane and stirred at room temperature during 6 hours. The reaction mixture was filtered and the filter cake was washed with 500 parts of dichloromethane and dried. 8.5 parts of compound:

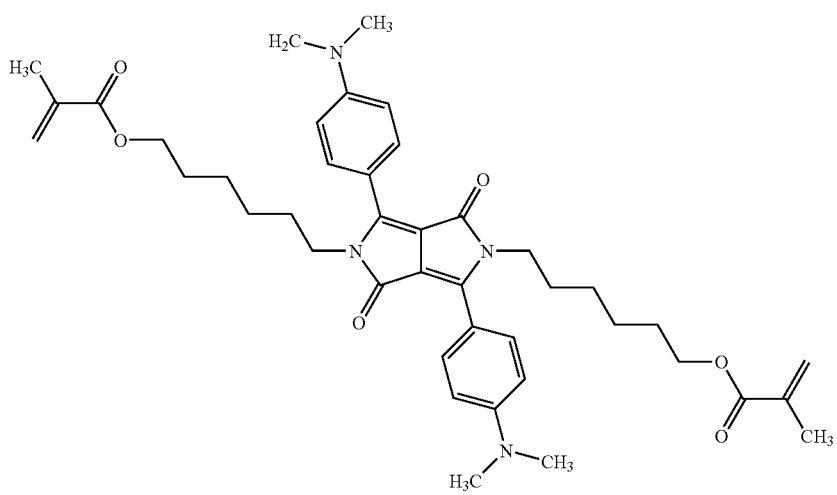

were obtained.

Example 6

Preparation of a Color Filter device (LCD)

2.78 g of the composition of example 5, 0.12 g of Solsperse® 22000 (Avecia), 0.58 g of Solsperse® 24000 (Avecia), 13.33 g of methoxy propyl acetate (RER 600, Olin Corp.) and 4.77 g of a 40% solution of an acrylate polymer in methoxy propyl acetate are added, diluted with 16.80 g of methoxy propyl acetate, then spin-coated on borosilicate glass plates (Corning 1737) at 1000 rpm. The coated glass plates are dried for 2 minutes at 10° C., then for 5 minutes at 200° C. on a hot plate to obtain a uniform red film of thickness 0.4-0.5 μm and excellent transparency and pure hue. Substantially, no sizeable crystals are observed under the optical microscope.

In a manner similar to example 1 the following compounds can be obtained:

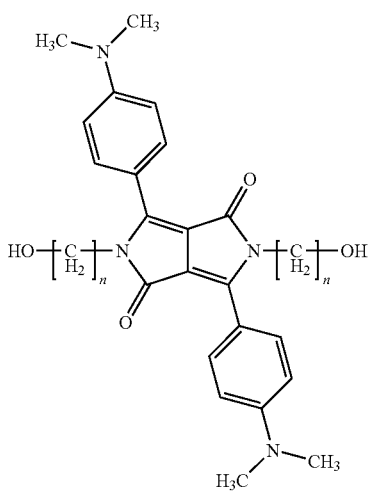

| Example | n |
|---|---|
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |

In a manner similar to example 2 the following compounds can be obtained:

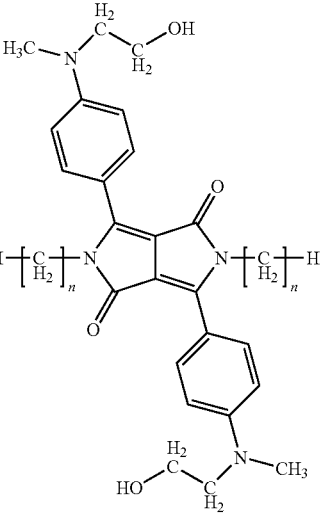

| Example | n |
|---|---|
| 16 | 8 |
| 17 | 9 |
| 18 | 10 |
| 19 | 11 |
| 20 | 12 |
| 21 | 13 |
| 22 | 14 |
| 23 | 15 |
| 24 | 16 |

In a manner similar to example 3 the following compounds be obtained:

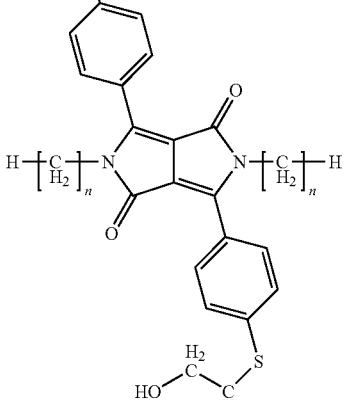

| Example | n |
|---|---|
| 25 | 8 |
| 26 | 9 |
| 27 | 10 |
| 28 | 11 |
| 29 | 12 |

-continued

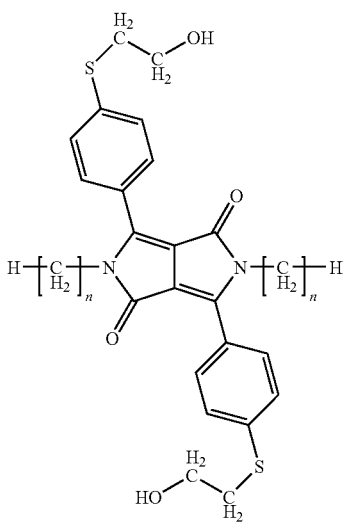

| Example | n |
|---------|----|
| 30 | 13 |
| 31 | 14 |
| 32 | 15 |
| 33 | 16 |

In a manner similar to example 4 the following compounds can be obtained:

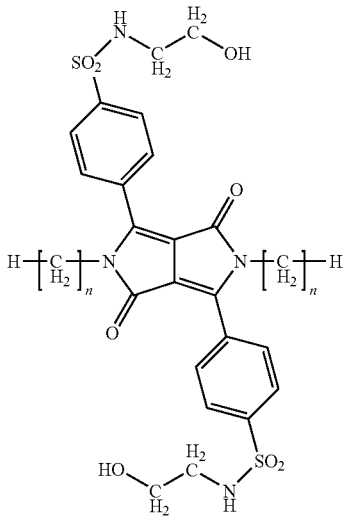

| Example | n |
|---------|----|
| 34 | 8 |
| 35 | 9 |
| 36 | 10 |
| 37 | 11 |
| 38 | 12 |
| 39 | 13 |
| 40 | 14 |
| 41 | 15 |
| 42 | 16 |

The invention claimed is:

1. A process of manufacturing a color filter with high transparency and pure hue wherein a pigmented high molecular weight organic material layer is applied to a transparent substrate, wherein the improvement consists of dispersing or dissolving from 1 to 75% by weight, based on the overall dry weight of the pigmented high molecular weight organic material layer, of a diketopyrrolopyrrole of formula (V)

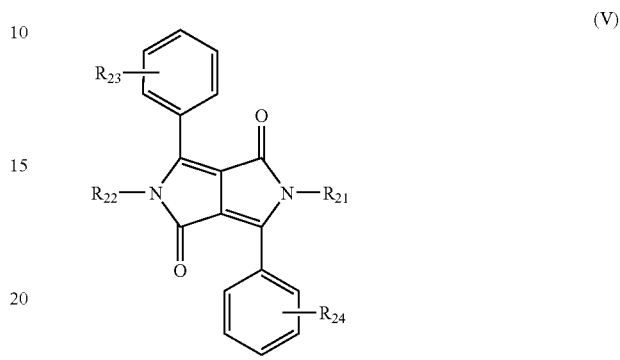

(V)

in a photosensitive or heat sensitive material and coating, printing, laminating or otherwise depositing the thus obtained dispersion or solution to form said pigmented high molecular weight organic material pigmented layer, wherein $R_{21}$ and $R_{22}$ are independently of one another hydrogen, $C_1$-$C_{18}$alkyl, $C_{02}$-$C_{18}$alkyl which is interrupted one or more times by O or S, benzyl, 2-benzyl-2-propyl, β-phenyl-ethyl, α,α-dimethylbenzyl, ω-phenyl-butyl, ω,ω-dimethyl-ω-phenyl-butyl, said benzyl, 2-benzyl-2-propyl, β-phenyl-ethyl, α,α-dimethylbenzyl, ω-phenyl-butyl or ω,ω-dimethyl-ω-phenyl-butyl substituted on aromatic protion by one or more $C_1$-$C_4$alkyl groups or $C_1$-$C_4$alkoxy groups, or a group of the formula

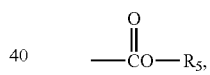

in which $R_5$ is $C_1$-$C_{18}$alkyl, $R_{23}$ and $R_{24}$ independently of one another are a group of formula —$X_1$—$X_2$—$X_3$, wherein $X_1$ is —O—, —S—, —NH—, —CONH—, —COO—, —$SO_2$—NH—, or —$SO_2$—O—, $X_2$ is $C_1$-$C_{18}$alkylene, optionally containing one or more groups —O—, —S— or —$NR_{14}$—, $X_3$ is —OH, —$NH_2$, —C($R_{11}$)=$CH_2$, —OC(O)—C($R_{12}$)=$CH_2$ or —C(O)—C($R_{12}$)=$CH_2$; wherein $R_{11}$ is hydrogen, or methyl, $R_{12}$ is hydrogen, or methyl, and $R_{14}$ is hydrogen, $C_1$-$C_8$alkyl, or $C_6$-$C_{12}$aryl.

2. The improvement according to claim 1, wherein in formula (V) $R_{23}$ and R24 independently of one another are a group of formula —$X_1$—$X_2$—$X_3$, wherein $X_1$ is —S—, —$SO_2$NH— or —NH—, and $X_3$ is —OH, —$NH_2$, —CH=$CH_2$, —C($CH_3$)=$CH_2$, —CO—CH=$CH_2$, —CO—C($CH_3$)=$CH_2$, —CO—CH=$CH_2$, or —CO—C($CH_3$)=$CH_2$.

3. The improvement according to claim 1, wherein in the group of formula —$X_1$—$X_2$-$X_3$, $X_3$ is —OH or —$NH_2$.

4. The improvement according to claim 2, wherein in the group of formula —$X_1$—$X_2$-$X_3$, $X_3$ is —OH or —$NH_2$.

5. The improvement according to claim 1, wherein in formula (V) $R_{21}$ and $R_{22}$ independently of one another are hydrogen or $C_1$-$C_{18}$alkyl.

6. The improvement according to claim 2 wherein in formula (V) $R_{21}$ and $R_{22}$ independently of one another are hydrogen, or $C_1$-$C_{18}$alkyl.

7. The improvement according to claim 1, wherein from 5 to 50% by weight, based on the overall dry weight of the pigmented high molecular weight organic material layer, of a diketopyrrolopyrrole of formula (V) are dispersed or dissolved in a photosensitive or heat sensitive material.

8. The improvement according to claim 1, wherein from 25 to 40% by weight, based on the overall dry weight of the pigmented high molecular weight organic material layer, of a diketopyrrolopyrrole of formula (V) are dispersed or dissolved in a photosensitive or heat sensitive material material.

* * * * *